(12) United States Patent
Welton et al.

(10) Patent No.: US 11,120,210 B2
(45) Date of Patent: Sep. 14, 2021

(54) ENTITY RECOGNITION FOR ENHANCED DOCUMENT PRODUCTIVITY

(71) Applicant: Microsoft Corporation, Redmond, WA (US)

(72) Inventors: Nickolas D. Welton, Seattle, WA (US); Benjamin E. Rampson, Woodinville, WA (US); Stephen J. Adelson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/335,860

(22) Filed: Jul. 18, 2014

(65) Prior Publication Data

US 2016/0019198 A1 Jan. 21, 2016

(51) Int. Cl.
*G06F 40/18* (2020.01)
*G06F 3/0484* (2013.01)

(52) U.S. Cl.
CPC .......... *G06F 40/18* (2020.01); *G06F 3/04842* (2013.01)

(58) Field of Classification Search
CPC ......... G06F 17/30572; G06F 17/30554; G06F 17/246; G06F 17/30994; G06F 3/04817; G06F 3/0482; G06F 16/252; G06Q 40/04; G06Q 40/06
See application file for complete search history.

(56) References Cited

U.S. PATENT DOCUMENTS

| | | | |
|---|---|---|---|
| 5,999,918 A | * | 12/1999 | Williams ............... G06Q 40/00 702/179 |
| 7,788,590 B2 | | 8/2010 | Taboada et al. |
| 8,504,908 B2 | | 8/2013 | Chisholm |
| 8,594,996 B2 | | 11/2013 | Liang et al. |
| 8,977,645 B2 | * | 3/2015 | Crow .................... G06F 40/106 707/770 |
| 10,229,101 B2 | * | 3/2019 | Otero .................... G06F 17/243 |
| 2002/0023077 A1 | * | 2/2002 | Nguyen ............ G06F 17/30696 |
| 2003/0033288 A1 | | 2/2003 | Shanahan et al. |

(Continued)

FOREIGN PATENT DOCUMENTS

| | | |
|---|---|---|
| CN | 1752975 A | 3/2006 |
| CN | 101263477 A | 9/2008 |

(Continued)

OTHER PUBLICATIONS

"International Search Report & Written Opinion Received for PCT Application No. PCT/US2015/040237", dated Oct. 12, 2015, 10 Pages.

(Continued)

*Primary Examiner* — Ariel Mercado

(57) ABSTRACT

Disclosed herein are systems, methods, and software for enhancing document productivity. In one implementation, various entries in a document are examined to identify at least an entry recognizable as an entity that is potentially related to at least one of various additional entities external to the document. At least a subset of the additional entities may be identified for surfacing in a user interface for potential inclusion in the document. In response to a selection of at least one of the subset of the additional entities, at least the one additional entity of the subset of the additional entities is included in the document in association with the entry.

20 Claims, 10 Drawing Sheets

(56) References Cited

U.S. PATENT DOCUMENTS

| | | | |
|---|---|---|---|
| 2006/0277176 A1* | 12/2006 | Liao | G06Q 10/10 |
| 2007/0192411 A1* | 8/2007 | Himmelstein | G06F 17/30389 |
| | | | 709/204 |
| 2009/0125828 A1* | 5/2009 | Fried | G06F 17/30601 |
| | | | 715/769 |
| 2011/0022941 A1 | 1/2011 | Osborne et al. | |
| 2011/0320459 A1 | 12/2011 | Chisholm | |
| 2013/0031500 A1 | 1/2013 | Bhola et al. | |
| 2013/0124964 A1 | 5/2013 | Viegas et al. | |
| 2013/0346844 A1 | 12/2013 | Graepel et al. | |
| 2018/0217972 A1* | 8/2018 | Vagell | G06F 17/245 |

FOREIGN PATENT DOCUMENTS

| | | |
|---|---|---|
| CN | 101410839 A | 4/2009 |
| CN | 100487695 C | 5/2009 |
| CN | 101794280 A | 8/2010 |
| CN | 102163215 A | 5/2011 |
| JP | 10040050 A | 2/1998 |
| JP | 2003114906 A | 4/2003 |
| JP | 20110108039 A | 6/2011 |
| RU | 2406129 C2 | 12/2010 |
| WO | 2014200724 A2 | 12/2014 |

OTHER PUBLICATIONS

Olanoff, Drew, "Google Drive Has a Handy Spreadsheet Autofill Option for Beer Drinkers", Retrieved at <<http://techcrunch.com/2013/03/05/google-drive-has-a-handy-spreadsheet-auto-fill-option-for-beer-drinkers/>>, Published on: Mar. 5, 2013, 34 Pages.

Karaa, Wahiba Ben Abdessalem, "Named Entity Recognition using Web Document Corpus", In International Journal of Managing Information Technology (IJMIT), vol. 3, No. 1, Feb. 28, 2011, 8 pages.

"Second Written Opinion Issued in PCT Application No. PCT/US2015/040237", dated May 2, 2016, 4 Pages.

"International Preliminary Report on Patentability Issued in PCT Application No. PCT/US2015/040237", dated Oct. 5, 2016, 6 Pages.

"First Office Action & Search Report Issued in Chinese Patent Application No. 201580039302.2", dated Oct. 15, 2018, 21 Pages.

"Office Action Issued in Japanese Patent Application No. 2016-575421", dated Mar. 8, 2019, 8 Pages.

"Office Action Issued in Russian Patent Application No. 2017101356", dated Jan. 22, 2019, 8 Pages.

"Office Action Issued in European Patent Application No. 15744796.2", dated Jan. 31, 2019, 4 Pages.

"Office Action Issued in Mexican Patent Application No. MX/a/2017/000824", dated Jun. 24, 2019, 4 Pages.

"Second Office Action Issued in Chinese Patent Application No. 201580039302.2", dated Jul. 3, 2019, 19 Pages.

"Office Action Issued in Chinese Patent Application No. 201580039302.2", dated Jan. 19, 2020, 11 Pages.

"Office Action issued in Australian Patent Application No. 2015289886", dated Apr. 17, 2020, 3 Pages.

"Office Action issued in Brazilian Patent Application No. BR112017000780-0", dated May 5, 2020, 5 Pages.

"Final Office Action Issued in Japanese Patent Application No. 2016-575421", dated Nov. 12, 2019, 5 Pages.

"Office Action Issued in European Patent Application No. 15744796.2", dated Feb. 8, 2021, 8 Pages.

"Office Action Issued in Australian Patent Application No. 2015289886", dated Jun. 15, 2020, 3 Pages.

"Summon to Attend Oral Proceedings Issued in European Patent Application No. 15744796.2", Mailed Date: Oct. 29, 2020, 6 Pages.

"Third Office Action and Search Report Issued in Chinese Patent Application No. 201580039302.2", dated May 19, 2020, 9 Pages.

Wu, Jiaomei, "Techniques for Using Functions in Financial Sheets", In Journal of Information & Communications, No. 5, May 31, 2013, pp. 132-133.

Min, et al., "Implementation of Automatic Table Filling by Using Access", In Journal of China Computer & Communication, No. 4, Apr. 30, 2010, pp. 166.

"Office Action Issued in Indian Patent Application No. 201747001383", dated Oct. 9, 2020, 07 Pages.

* cited by examiner

ENTITY RECOGNITION FOR ENHANCED DOCUMENT PRODUCTIVITY

TECHNICAL FIELD

Aspects of the disclosure are related to computing hardware and software technology, and in particular, to enhancing document productivity.

TECHNICAL BACKGROUND

Productivity applications are utilized for a wide variety of tasks, including creating and working with documents, such as word processing documents, spreadsheets, and presentations. Examples of productivity applications include, but are not limited to, word processors, spreadsheet software, presentation applications, note taking applications, and collaboration software.

An increasing number of productivity applications are delivered as software services from what is colloquially referred to as the cloud. In these deployments, a local application may run on a user's device that provides a user interface to an application service hosted in a data center or some other computing environment. The documents that a user works with may be stored locally but may also be stored by the service or by an associated cloud-based storage service. Any number of computing devices may be leveraged to take advantage of such services, including, but not limited to, mobile devices, smart phones, laptops, tablets, desktop computers, and any other suitable platform.

A common task performed within documents in the context of a productivity application includes entering text, such as when a user is typing a paragraph in a word processing document or inputting numbers or strings in a spreadsheet. When engaged with a document in this manner, a user may lack contextual knowledge or awareness of the information they are entering and, as such, may need to consult other resources to discover other information with which to supplement their document. In a brief example, a user may be engaged in creating a list of people for an event. The user may have sufficient knowledge of the invitees such that their names can be entered. But beyond their names, the user may need to consult a contacts list in order to obtain contact information for the invitees. In another example, a user may consult a website to obtain supplemental data for a document.

Many applications provide a limited amount of contextual awareness in the form of automatic spell-check features, formula checking, and the like. Associated sub-services run in the background and may continually check the content in a document for spelling errors, inconsistent formulas, or other aspects of a document that can be monitored.

OVERVIEW

Provided herein are systems, methods, and software to enhance document productivity. In various implementations, documents are scanned for entries that are recognizable as entities. When an entity is discovered, an indication may be surfaced in a user interface that, when engaged by a user, may allow the user to explore additional information about the entity that is obtained from data sources external to the document. The user may add to the entry or otherwise supplement the document by selecting from the information found in the external data sources, thereby enhancing the document.

In one particular implementation, various entries in a document are examined to identify at least an entry recognizable as an entity that is potentially related to at least one of various additional entities external to the document. Then, at least a subset of the additional entities are identified for surfacing in a user interface for potential inclusion in the document. In response to a selection of at least one of the subset of the additional entities, at least the one additional entity of the subset of the additional entities is included in the document in association with the entry.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
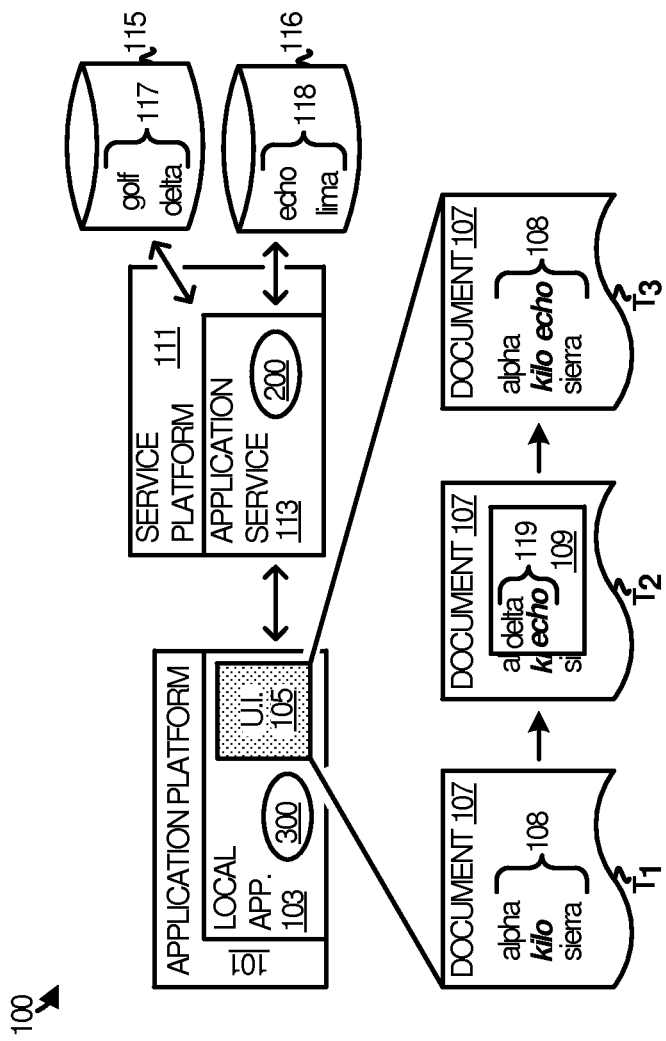
FIG. 1 illustrates a service architecture and an associated operational scenario in an implementation of enhanced document productivity.

Implementations disclosed herein enhance the user experience when entering text and other data in documents. Document productivity is enhanced when entries are recognized that qualify as entities, or entries having qualities or characteristics that indicate other information outside of a document may be useful for supplementing the entries in the document. The other information can be gathered from various data sources and presented to a user for inclusion in the document, if so desired.

In at least one implementation, an application service enhances document productivity by examining various entries in a document hosted by the application service to identify at least an entry recognizable as an entity. An entry may be recognized as an entity when, for example, it is potentially related to at least one of various additional entities external to the document.

The application service then identifies at least a subset of the additional entities to surface in a user interface to the application service for potential inclusion in the document. In response to a selection of at least one of the subset of the additional entities received via the user interface, the application service includes at least the one of the subset of the additional entities in the document in association with the entry.

In some scenarios, a subsequent entry may be identified that is recognizable as a subsequent entity. The subsequent entry may be potentially related to at least a subsequent one of the additional entities external to the document. The application service identifies the subsequent one of the additional entities based at least in part on a pattern of association established with respect to the entity and the at least one of the subset of additional entities and stores it or otherwise includes it in the document in association with the subsequent entry.

Examples of a document for which the user experience may be enhanced include word processing documents, presentations, and spreadsheets. In the case of a spreadsheet, an entry may include text entered in a cell in the spreadsheet defined by a row and a column pair. A subsequent entry may thus be subsequent text entered in a subsequent cell in the spreadsheet defined by a subsequent row and column pair.

An application may in some implementations surface the additional entities within a card in the user interface that is rendered above the document. The application receives the selection of at least the one of the subset of the additional entities via the card. Examples of the selection include a drag operation that drags at least the one of the subset of the additional entities from the card to the document.

The application may surface an indication in the user interface that an entry had been recognized as the entity. In some cases the indication may include a confidence indicator that represents a level of confidence associated with identifying the entry as the entity. The additional entities that are identified as related to an entity may reside in a source external to the document, such as in a contacts database or a web site.

Referring now to the drawings, FIG. 1 illustrates service architecture 100 and an associated operational scenario in an implementation that demonstrates various aspects of enhanced document productivity. Service architecture 100 includes application platform 101 and service platform 111. Local application 103 is executed within the context of application platform 101, while application service 113 is hosted by and runs within the context of service platform 111.

Local application 103 may be considered remote from application service 113 in that each are implemented on separate computing platforms. In such situations, local application 103 and application service 113 may communicate by way of data and information exchanged between application platform 101 and service platform 111 over a suitable communication link or links (not shown). However, it is possible that in some implementations the features and functionality provided by local application 103 and application service 113 could be co-located or even integrated as a single application.

Data source 115 and data source 116 each represent data sources that are external to document 107. Each data source may be a repository that is hosted by or considered integrated with application service 113. However, each data source may also be part of some other service that is separate and distinct from application service 113. Examples of data source 115 and data source 116 include contacts databases, websites, an active directory database, lists, maps, accounts, and any other type of data source.

In operation, local application 103 renders document 107 in user interface 105. Document 107 includes various entries 108 represented by the words alpha, kilo, and sierra. Application service 113 scans, monitors, or otherwise examines document 107, or a copy thereof, to identify entries that are representative of entities. In this example, the word "kilo" is represented as an entity and an indication is surfaced in user interface 105 accordingly. The indication is represented by the bold and italic font provided with respect to the word "kilo," although other ways to surface an indication are possible.

Next, application service 113 identifies a subset 119 of the other entities that may be associated with the entry in document 107 that was identified as an entity. The subset 119 of the other entities is identified from sources external to document 107 which are represented by data source 115 and data source 116. Data source 115 includes other entities 117 represented by the words "golf" and "delta." Data source 116 includes other entities 118 represented by the words "echo" and "lima." The other entities that may be associated with the subject entry are surfaced in user interface 105 as represented by a view 109 or other such graphical representation of the subset 119 of the other entities. The subset 119 includes the information delta and echo.

Either or both of the information items presented in the view 109 may be selected by a user for further inclusion in document 107. In this example, the word echo is selected and is therefore included in document 107. The word echo is shown as included nearby the word kilo in the document, thus representing that the two entities are stored in association with one another in document 107.

Figure 2:
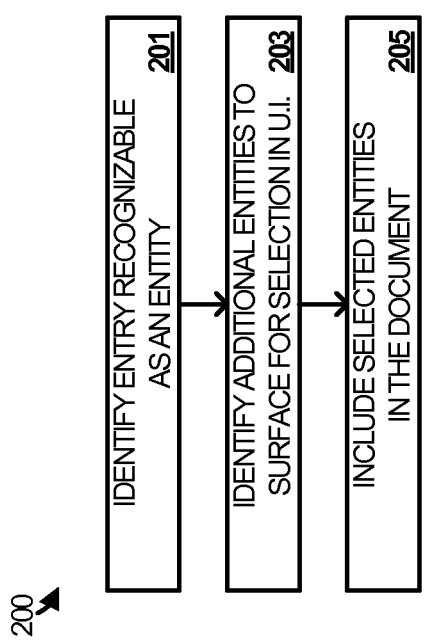
FIG. 2 illustrates a document process that may be employed by an application service in an implementation.

FIG. 2 illustrates with more particularity some of the functionality that may be employed by application service 113, as represented by document process 200. The following describes the steps illustrated in FIG. 2, which are noted parenthetically.

In operation, application service 113 scans a given document for any entries that may be recognizable as an entity, eventually identifying at least one entry as an entity (step 201). A document may include various entries, such as text, words, strings, numbers, symbols, images, and the like.

An entry may be recognizable as an entity based on various characteristics that may be associated with the entry that identify the entry as associated with other entities in a data source external to the document. For example, a text entry may be recognized as the name of a person in a list or contacts database. In another example, a number may be recognized as an address or other such identifier. The author of an entry, the position of an entry in a document, the format style of an entry, or any other characteristic may allow application service 113 to recognize an entry as an entity. Yet other characteristics that may make an entry recognizable as an entity include the data connection or connections associated with an entry, the visual type of an entry, whether or not an entry is a query, or the like. Just the fact that a data source external to a document can be queried successfully based on or using an entry may lead the entry to be recognized as an entity.

When an entry is recognized as an entity, an indication of such is surfaced in a user interface to the document. A user may elect to further explore the entity in terms of considering other entities for inclusion in the document. When this occurs, application service 113 identifies which additional entities to surface in the user interface for selection in the document (step 203). The user may select one or more of the entities and application service 113 can store the selected entity or entities in the document (step 205). In some scenarios, application service 113 the selected one or more of the entities may be returned by application service 113 to local application 103 for joining with the identified entity.

Figure 3:
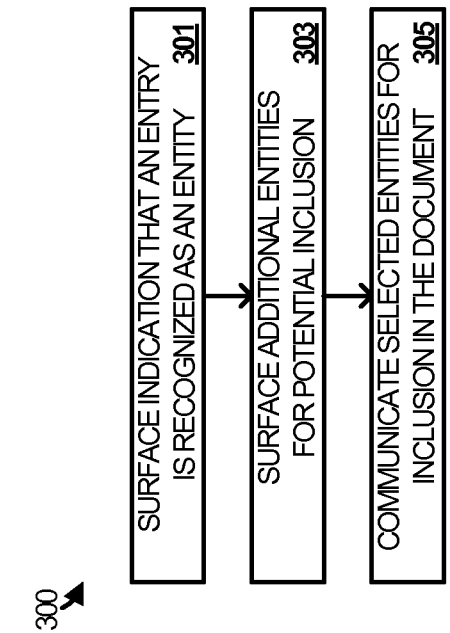
FIG. 3 illustrates a document process that may be employed by a local application in an implementation.

FIG. 3 illustrates with more particularity some of the functionality that may be employed by local application 103, as represented by document process 300. The following describes the steps illustrated in FIG. 3, which are noted parenthetically.

In operation, application service 113 may identify an entry in a document as an entity, the fact of which is communicated to local application 103. Local application 103 surfaces an indication in user interface 105 that an entity has been recognized (step 301). Surfacing the indication may include altering the visual appearance of an entry or the appearance of an area surrounding the entry. In another example, a discrete symbol or identifier may be rendered that indicates that an entity has been recognized.

Additional entities may then be surfaced for potential inclusion in the document (step 303). The additional entities may be identified by application service 113 and may be surfaced in such a manner that a user may select one or more of them for inclusion in the document. When this occurs, local application 103 communicates messaging or other such information to application service 113 that explains which other entities have been altered and thus may be suitable for including in the document (step 305).

Figure 4:
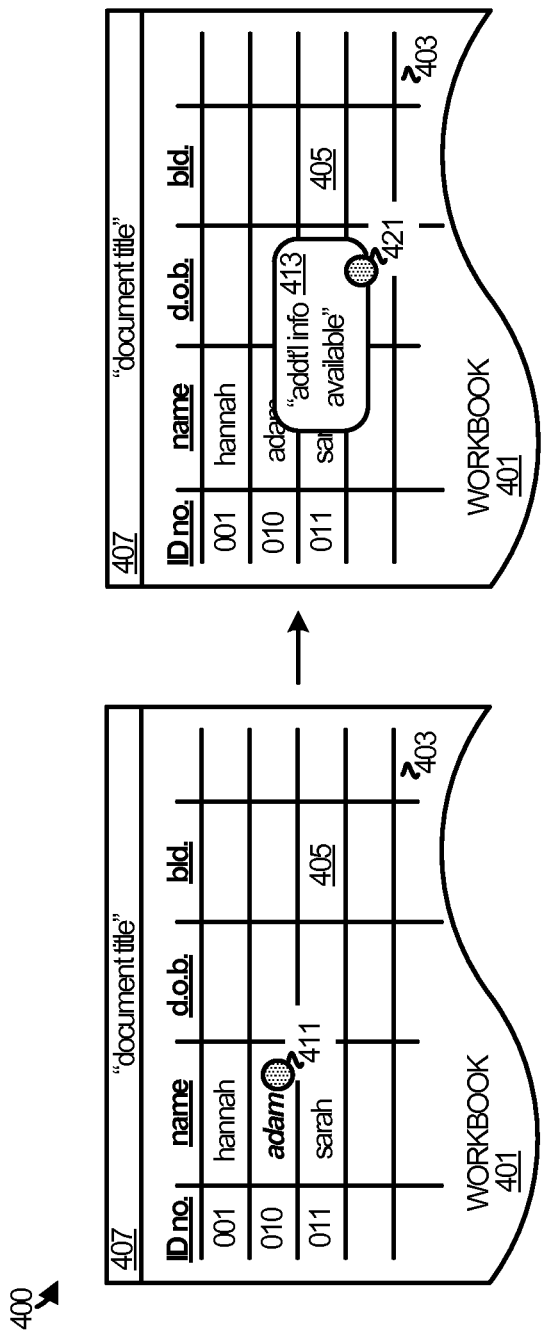
FIG. 4 illustrates a stage in a user experience with a workbook in an implementation of enhanced document productivity.
Figure 9:
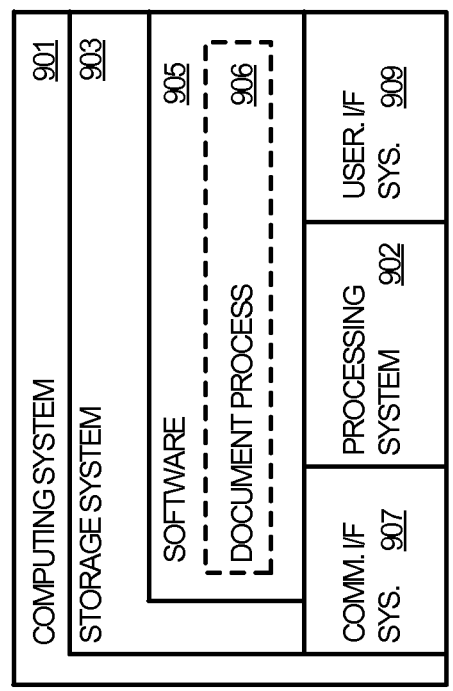
FIG. 9 illustrates a computing system suitable for implementing any of the applications, services, processes, architectures, user experiences, and operational scenarios disclosed herein with respect to FIGS. 1-8 and discussed below in the Technical Disclosure.

FIG. 4 illustrates a stage 400 in a user experience that may be encountered with respect to a workbook in which enhanced document productivity is employed. The user experience involves workbook 401, which is representative of a workbook that may be produced by a spreadsheet application, such as Microsoft® Excel®. A user may be presented with the user experience by way of his or her interaction with a suitable application platform via which a user interface to workbook 401 may be presented. The user experience is representative of the various visual representations of workbook 401 that may be surfaced to the user, but also includes the various ways in which the user may interact with workbook 401 by way of a suitable user interface system provided by the application platform, of which computing system 900, illustrated with respect to FIG. 9, is representative.

Workbook 401 includes spreadsheet 403, which is defined by various cells 405. Workbook 401 also includes a feature bar 407 that may identify the name of the workbook and could include various feature menus, options, and the like. Other elements in addition to or in place of those illustrated in FIG. 4 are possible and may be considered within the scope of the present disclosure.

In this stage 400 of the user experience, each cell may be defined by a row number and a column number, which are not shown. A user has created a simple table for tracking an event or organization of some kind. The table includes various rows of data that are sub-divided by columns. The columns are assigned labels by the user, including: identification number, name, date of birth, and building. Some data has been entered in the rows including the identification number and name of three people involved in the event or organization. Specifically, the people in the list include "hannah," "adam," and "sarah" associated with identification numbers "001," "010," and "111" respectively.

In operation, workbook 401 is subjected to one or more document processes, such as document process 200 and document process 300, employed by one or both of a local application and an application service, of which local application 103 and application service 113 are representative. As such, the document processes drive part of the user experience. For example, workbook 401 is subject to scanning by a document process in order to identify entries in spreadsheet 403 that may be recognizable as entities. In this example, the entry "adam" is recognized as an entity and a corresponding visual indication is surfaced to represent to a user that it is an entity. In this example, the text "adam" is presented in a bold and italicized fashion to standout from other entries that either are not entities or are not identified as such at the same time as "adam." Other mechanisms are possible for indicating its discovery as an entity, such as by highlighting the cell in which the text is found or surfacing a discrete icon or graphic that represents its status as an entity.

It may be appreciated that in some cases a single entry alone may not be recognized as an entity, but when considered in combination with one or more other entries, the group of entries may be considered an entry. For instance, "adam" alone might not be recognized as an entity, but "adam" joined with "010" or other information might be recognized as an entity. In this and other examples disclosed herein, single entries are provided for illustrative purposes, although recognizing multiple entries as a single entity may be considered within the scope of the present disclosure.

In addition, in some cases a single entry alone may not be recognized as an entity without some surrounding context provided by other entries, possibly adjacent to the single entry. Another entry or entries, when considered with the single entry, may assist with identifying the single entry as an entity. For example, the name "adam" alone may not be recognized as an entity. But by virtue of its proximity to, or just the presence of, the name "sarah," the name "adam" may be recognized as an entity. This may be distinguished from the example immediately above in that "adam" represents a single-entry entity, while "adam" joined with "010" in the preceding example represents a multiple-entry entity.

The user may then actively interact with the indication so as to explore what options may exist for enhancing the highlighted entry. A selection 411 is representative of the interaction, which may be a mouse click, a touch, a spoken command, a gesture, a tap, or some other type of user input. A graphic 413 is surfaced in response to the user input that explains what options may be available for exploring the entry. In this case, graphic 413 includes text that explains that additional information is available that may be related to the entry. The additional information may be found in other data sources external to workbook 401, such as a contacts database, website, or the like.

Figure 5A:
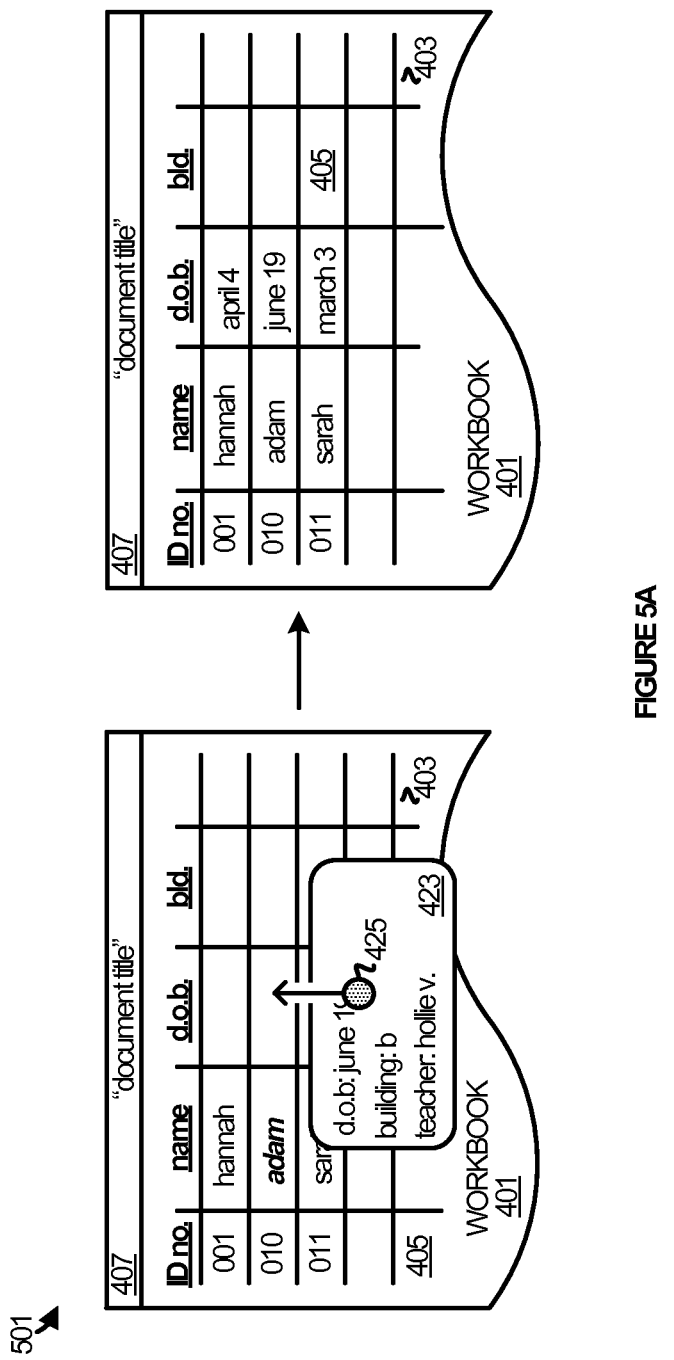
FIGS. 5A-5C illustrate various stages in a user experience with a workbook in an implementation of enhanced document productivity.
Figure 5B:
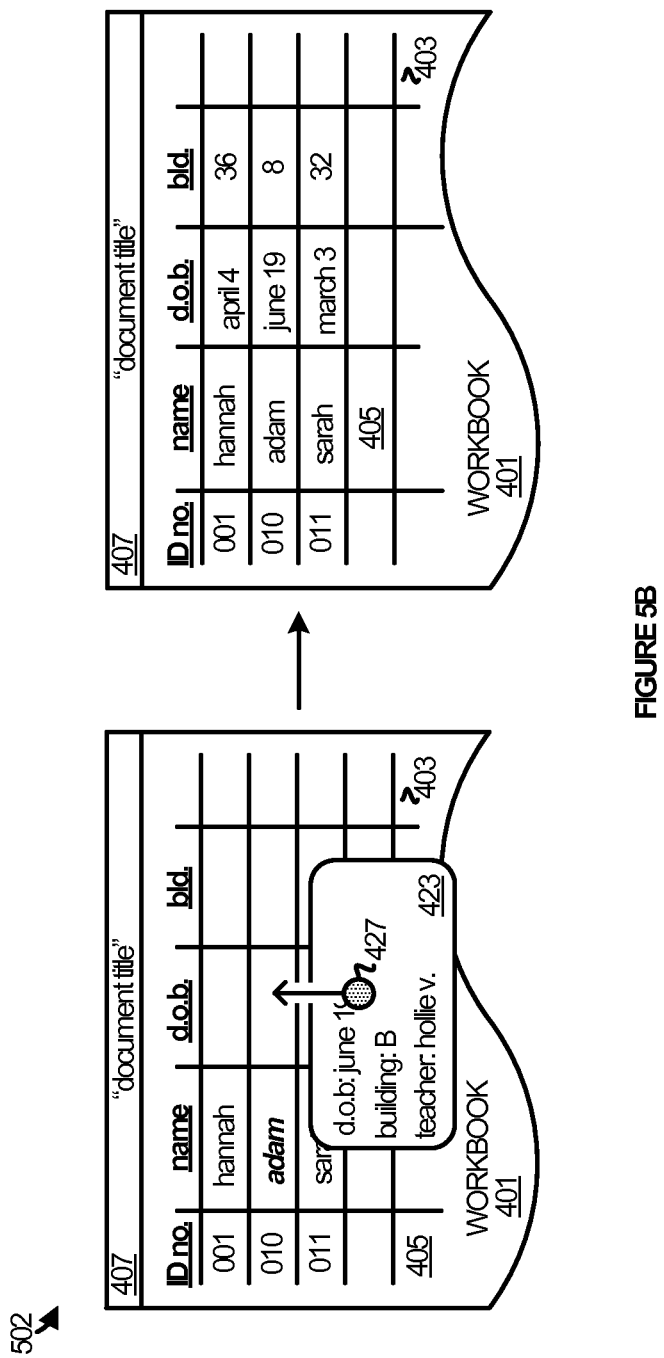
Figure 5C:
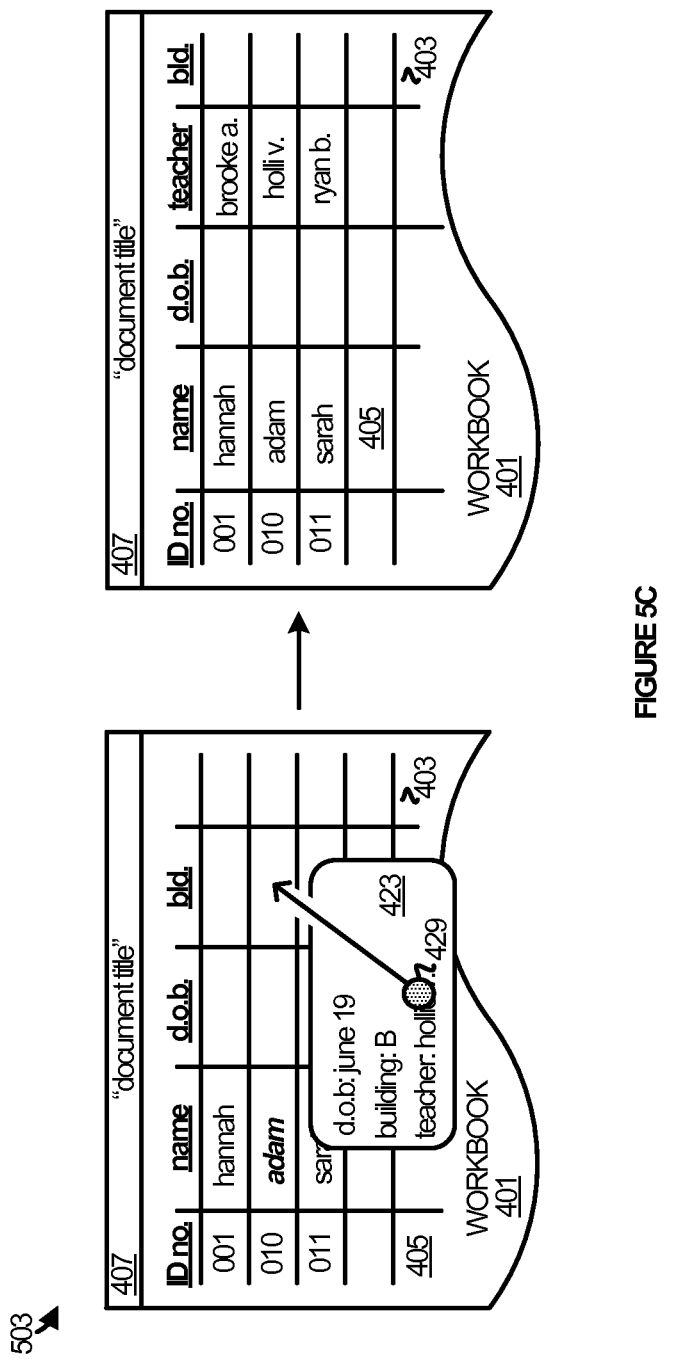

The user may make another selection 421 with respect to graphic 413 that launches the user into another stage of the user experience. FIGS. 5A, 5B, and 5C illustrate various stages 501, 502, and 503 respectively that may be encountered upon the user making selection 421 with respect to graphic 413.

Referring to FIG. 5A, stage 501 in the user experience represents a stage that may be encountered upon the user making selection 421 in stage 400. In stage 501, card 423 is surfaced which includes additional information that may have been identified as associated with or otherwise related to the entity "adam." The additional information may itself include additional entities but may also include information that is simply additional detail for an entity that wouldn't by itself be recognized as an entity. Here, the additional information includes data of birth information ("june 19"), a building identifier ("b") and a name of a teacher for the entity ("holli v."). Card 423 could include other information in addition to that shown herein, such as the name of the entity with which it is associated, "adam." This might be especially true in cases where card 423 is representative of a contact card or some other object that includes identifying information. Card 423 may also show other information that is already included in workbook 401 to provide context or for other reasons.

The user may thus consider the additional information that has been surfaced and may decide whether or not to include any or all of the additional information in spreadsheet 403. In this example, the user decides in the affirmative to include at least the date of birth information. Accordingly, the user makes a selection 425 of the date of birth information which results in its inclusion in spreadsheet 403. Selection 425 may be, for example, a drag and drop operation by which the user drags the date of birth information from card 423 to a location in spreadsheet 403 where the user desires to deposit it. The location for the date of birth information is the cell in the row for the entry "adam" that corresponds to the column labeled date of birth.

Upon the user making selection 425, not only is the date of birth information deposited in a cell, but other date of birth information for other entries similarly-identified as entities in spreadsheet 403 is also retrieved and deposited in their corresponding cells. This may occur automatically simply by virtue of the user having made one selection with respect to one instance of additional information. It may be appreciated that this feature is optional and may not occur in every situation. In some scenarios a menu, control, or other such graphic may surface that asks the user for permission to auto-populate the other cells. If the users provides his or her approval, then the process can move forward and the additional information can be placed into the corresponding cells. If not, then the process may stop.

FIG. 5B illustrates an alternative stage 502 that is similar to stage 501 but that provides some feature variation. Stage 502 in the user experience also represents a stage that may be encountered upon the user making selection 421 in stage 400. In stage 502, card 423 is surfaced which includes additional information (additional entities) that may have been identified as associated with or otherwise related to the entity "adam." The additional information includes date of birth information ("june 19"), a building identifier ("b") and a name of a teacher for the entity ("holli v.")

The user may thus consider the additional information that has been surfaced and may decide whether or not to include any or all of the additional information in spreadsheet 403. In this example, the user decides in the affirmative to include at least the date of birth information. Accordingly, the user makes a selection 427 of the date of birth information which results in its inclusion in spreadsheet 403. Selection 427 may be, for example, a drag and drop operation by which the user drags the date of birth information from card 423 to a location in spreadsheet 403 where the user desires to deposit it. The location for the date of birth information is the cell in the row for the entry "adam" that corresponds to the column labeled date of birth.

Upon the user making selection 427, not only is the date of birth information deposited in a cell, but other date of birth information for other entries in spreadsheet 403 is also retrieved and deposited in their corresponding cells. This may occur automatically simply by virtue of the user having made one selection with respect to one instance of additional information. It may be appreciated that this feature is optional and may not occur in every situation. In some scenarios a menu, control, or other such graphic may surface that asks the user for permission to auto-populate the other cells. If the users provides his or her approval, then the process can move forward and the additional information can be placed into the corresponding cells. If not, then the process may stop.

In addition to loading in other date of birth information, spreadsheet 403 is populated with yet more additional information, namely the building number for each person identified in spreadsheet 403. In other words, even though selection 427 was made with respect to just the date of birth information in card 423, spreadsheet 403 is also populated with building number information. This may occur automatically simply by virtue of the user having made one selection with respect to one instance of additional information. It may be appreciated that this feature is optional and may not occur in every situation. In some scenarios a menu, control, or other such graphic may surface that asks the user for permission to auto-populate the other cells. If the users provides his or her approval, then the process can move forward and the additional information can be placed into the corresponding cells. If not, then the process may stop.

FIG. 5C illustrates an alternative stage 503 that is similar to stage 501 and stage 502, but that differs in some respects. Stage 503 in the user experience also represents a stage that may be encountered upon the user making selection 421 in stage 400. In stage 503, card 423 is surfaced which includes additional information (additional entities) that may have been identified as associated with or otherwise related to the entity "adam." The additional information includes date of birth information ("june 19"), a building identifier ("b") and a name of a teacher for the entity ("holli v.")

The user may thus consider the additional information that has been surfaced and may decide whether or not to include any or all of the additional information in spreadsheet 403. In this example, the user decides in the affirmative to include at least the teacher information. However, a column for the names of teachers does not yet exist in spreadsheet 403. Accordingly, the user makes a selection 429 of the teacher information which results in its inclusion in spreadsheet 403 by way of a column insertion. Selection 427 may be, for example, a drag and drop operation by which the user drags the teacher information from card 423 to a location in spreadsheet 403 where the user desires to deposit it. A new column is automatically inserted between the date of birth column and the building number column in response to selection 429. The new column is then populated with the names of teachers for the various entities in spreadsheet 403. In some implementations, a user may have the ability to insert not just a single entity value onto a sheet, but may instead elect to drop the entire set of entity values into a document as a new table/relationship. For example, the user may leave a current table of student name, id, and test grade in a sheet, but if a name is recognized as an entity, import a table of full person entity information into the document for relevant matches. Then when performing analysis, applications like Excel® can join those tables and allow for creation of mashup reports (ex. average grade of student by teacher), without having that additional data clutter their original table.

Stages 501, 502, and 503 each illustrate various operations that may occur with respect to a user experience with workbook 401. It may be appreciated that other operations in addition to or in place of those represented in FIGS.

5A-5C are possible and may be considered within the scope of the present disclosure. In addition, some of the steps illustrated in FIGS. 5A-5C may be combined with each other in various ways to provide yet more variations on the user experience with workbook 401. For example, because the processes described herein are iterative, information that is surfaced as related to an entity and deposited in a sheet may itself be identified as an entity. A card can then be surfaced for that entity with additional information that may be relevant, and so on.

Figure 6:
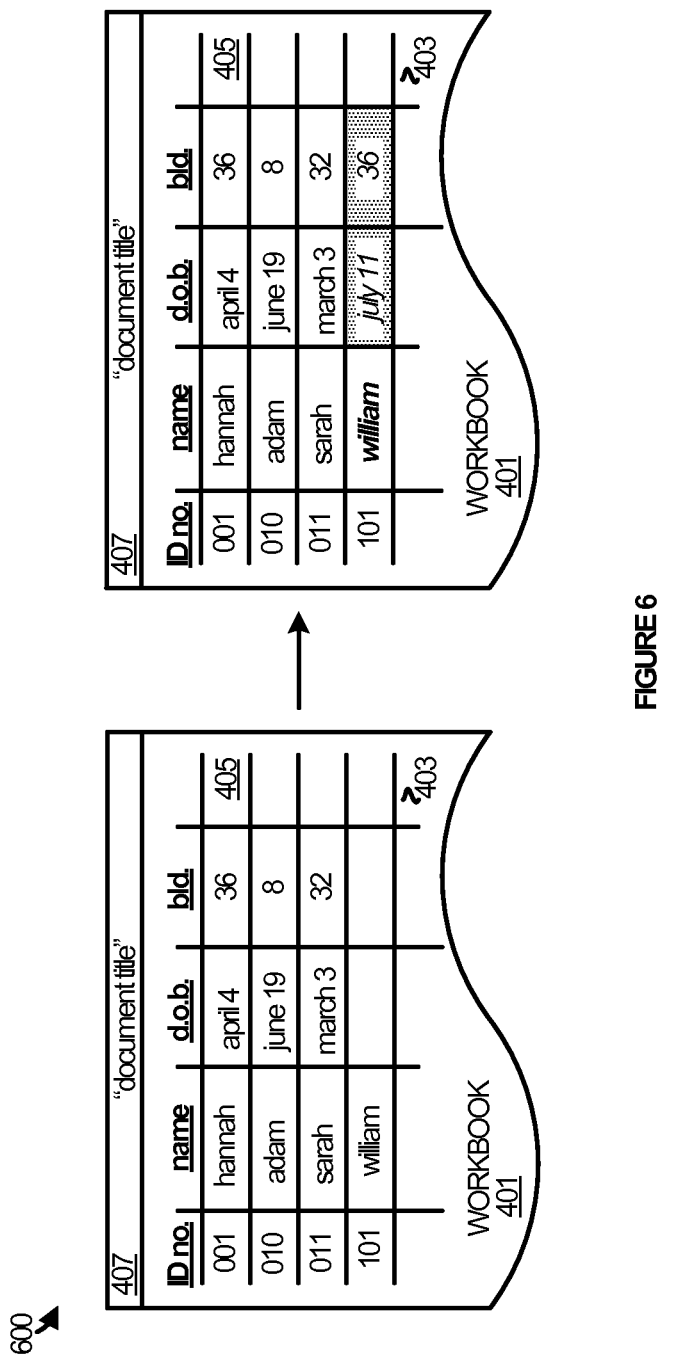
FIG. 6 illustrates a stage in user experience with a workbook in an implementation of enhanced document productivity.

FIG. 6 illustrates an alternative stage 600 that may be encountered within the context of a user experience with workbook 401. Stage 600 may follow any of the stages 501, 502, and 503 illustrated with respect to FIGS. 5A-5C or may occur separately from those stages. In operation, spreadsheet 403 has been populated with information in all of the columns labeled by the user. For instance, identification numbers, names, dates of birth, and building numbers have been provided and included in spreadsheet 403.

In a next step, a new entry is entered in the fourth row of the table created in spreadsheet 403. Specifically, the text "william" is entered. A document process running in the background recognizes the new entry as an entity. Rather than surfacing a graphic or other such control alerting the user to the presence of an entity, the cells proximate to the cell in which "william" was entered are auto-filled with additional information that is potentially related to the entity. The date of birth for the entity is auto-filled, as well as the building number for the entity. The date of birth and the building number may be retrieved from data sources external to workbook 401. Moreover, the date of birth and the building number, like other additional information items, may each reside in different data sources, although it is possible that they are stored in the same data source.

The additional information that is identified for auto-filling spreadsheet 403 may be selected based at least in part on a pattern of association established with respect to an entity and other additional entities that may have been previous selected. For example, assuming the entry "adam" had been identified as an entity, and further assuming that corresponding date of birth and building information had been selected by a user for inclusion in workbook 401, a pattern of association would have been established between the name and the data of birth. Another pattern of association would have been established between the name and the building information. Both patterns of association can then be used when other entities are recognized, such as the entry "william." In some scenarios, a data connection may be established when dropping information into a sheet from a card or other object in which additional information is surfaced. In this manner, such supplemental information can be dynamically refreshed and updated as it changes. The building information may change, for instance, when "adam" or "william" are assigned to new buildings or offices.

As other text is entered and recognized as an entity, past patterns of association that had been discovered with respect to other entities can be used to pull new information from the various data sources that may exist external to workbook 401. For instance, a particular data source may include a set of records. A pattern may be created when a particular record and specific fields within the record are found to be suitable sources of additional information for a given entity in workbook 401. The same fields, but in different records, can be used to extract additional information for new entities that may be entered into workbook 401.

In another example, a particular page in a website may include information that is identified as suitable for inclusion in workbook 401 in association with an entry, thereby establishing a pattern of association that can be leveraged for other entries identified as entities. The same or similar page in another website may thus be consulted to extract information that may be considered suitable for inclusion in workbook 401 in association with another entry.

In a simple use-case, the website for a college or university may include a specific page with enrollment and student population information. Another website for another college may thus include an analogous page with enrolment and student population information for that college. The enrollment information for the first college may be used to supplement one entity in a workbook while the enrollment information for the second college may be used to supplement another entity the workbook.

Figure 7:
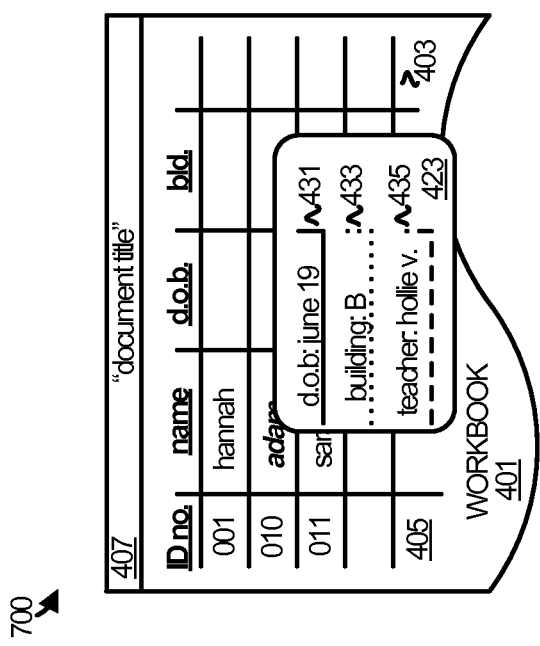
FIG. 7 illustrates a stage in a user experience with a workbook in an implementation of enhanced document productivity.

FIG. 7 illustrates another possible stage 700 that may be encountered within the context of a user experience with workbook 401. In stage 700, card 423 is surfaced which includes additional information (additional entities) that may have been identified as associated with or otherwise related to the entity "adam." The additional information includes data of birth information ("june 19"), a building identifier ("b") and a name of a teacher for the entity ("holli v.")

In addition, card 423 includes various confidence indicators that each represent a confidence level associated with a given one of the additional information items. Confidence indicator 431 represents a level of confidence that the date of birth information is actually related to the entity, "adam." Confidence indicator 433 represents a level of confidence that the building information is actually related to the entity, "adam." Confidence indicator 435 represents a level of confidence that the teacher information is actually related to the entity, "adam."

In this example, each confidence indicator has a visual representation that is different than the others, which represents that the confidence in each respective information item varies relative to the others. This may be the case because, for example, the data sources from which the information items are drawn may vary. As with the other stages illustrated in the preceding figures, the user may consider the additional information that has been surfaced and their associated confidence levels when deciding whether or not to include any or all of the additional information in spreadsheet 403. Lineage information about the additional information being surfaced may also be surfaced. The lineage information may explain something about the additional information, such as the data source it is drawn from, whether it is a government or public website, an internal database or directory, or the like.

Figure 8:
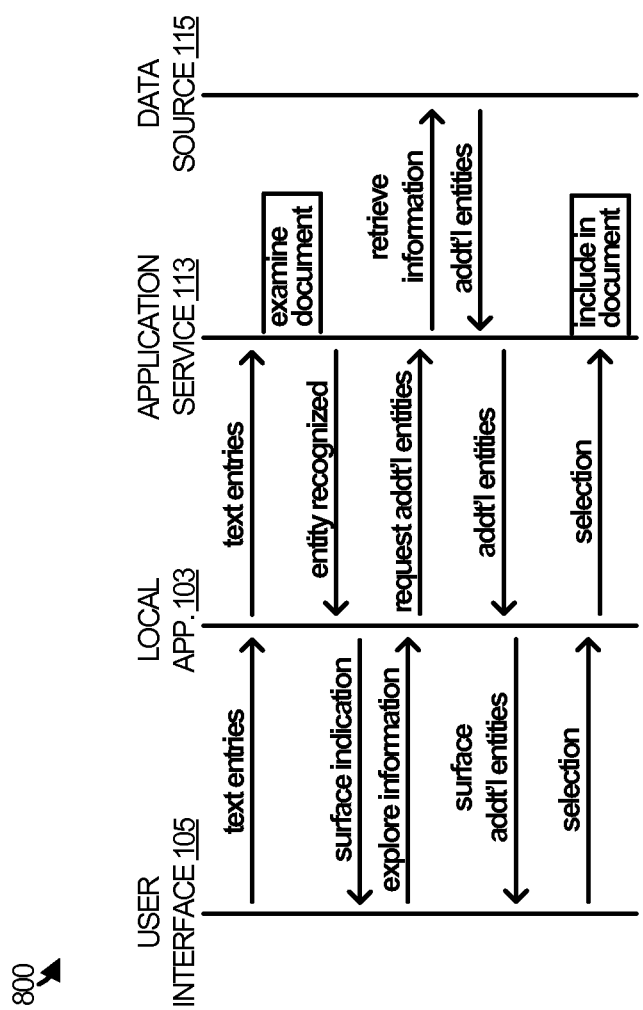
FIG. 8 illustrates an operational sequence in an implementation.

FIG. 8 illustrates an operational sequence 800 that is representative of a message and information exchange that may occur in an implementation of enhanced document productivity. In operation, text entries are input by a user via user interface 105. The text entries are communicated by local application 103 to application service 113. Application service 113 examines document 107 and the text entered therein. Such an examination may occur as data is entered, periodically, or on a continuous basis, or in some other manner. Assuming an entity (or entities) is recognized, application service 113 communicates that fact to local application 103. Local application 103 is able to drive the surfacing of an indication that an entry is an entity in user interface 105.

The user engaged with user interface 105 may select the indication so as to further explore additional information that may be associated with the entity. When this happens, local application 103 requests the additional entities from application service 113. Application service 113 retrieves the additional information from data source 115 and possibly from another data source. The additional information may be retrieved in response to the request by local application 103 but may also occur proactively before the request, such as in response to having recognized an entry as an entity.

Application service 113 provides the additional entities to local application 103. Local application 103 surfaces the additional entities in user interface 105. The user engaged with user interface 105 may select one or more of the additional entities to include in document 107. The selection is provided by user interface 105 to local application 103, which in turn communicates the selection to application service 113. Application service 113 can then include the additional entity or entities in document 107. In some scenarios application services 113 returns the additional entity or entities to local application 103 so that local application 103 can include them in document 107. Other information may also be returned, such as connection information, allowing local application 103 to build a data connection with which to refresh its information.

It may be appreciated from the foregoing discussion of FIGS. 1-8 that various technical effects may be achieved when implementing enhanced document productivity as discussed herein. Among other possible benefits, information may be more easily identified and included in a document that may supplement information that is already in the document. Such a tool improves the user experience by potentially reducing the amount of time needed to create a table or other such aggregation of data.

Referring back to FIG. 1, application platform 101 is representative of any physical or virtual computing system, device, or collection thereof capable of hosting local application 103 and employing document process 300. Examples include, but are not limited to, smart phones, laptop computers, tablet computers, desktop computers, hybrid computers, gaming machines, smart televisions, entertainment devices, Internet appliances, and virtual machines, as well as any variation or combination thereof, of which computing system 901 illustrated in FIG. 9 is representative.

Local application 103 is representative of any software application, module, component, or collection thereof, capable of implementing user interface 105. Examples include, but are not limited to, word processing applications, spreadsheet applications, presentation applications, web browsers, email applications, blogging and micro-blogging applications, social networking applications, e-commerce applications, and gaming applications, as well as any other type of suitable application. Local application 103 may be a browser-based application that executes in the context of a browser application. In some implementations, local application 103 may execute in the context of or in association with a web page, web site, web service, or the like. However, local application 103 may also be a locally installed and executed application, a streamed application, a mobile application, or any combination or variation thereof. Local application 103 may be implemented as a stand-alone application or may be distributed across multiple applications.

Service platform 111 is representative of any physical or virtual computing system, device, or collection thereof capable of hosting all or a portion of application service 113 and implementing all or portions of document process 200. Examples of service platform 111 include, but are not limited to, server computers, web servers, application servers, rack servers, blade servers, virtual machine servers, or tower servers, as well as any other type of computing system, of which computing system 901 illustrated in FIG. 9 is representative. In some scenarios, service platform 111 may be implemented in a data center, a virtual data center, or some other suitable facility.

Application service 113 is any software application, module, component, or collection thereof capable of employing document process 200 and providing an application service to local application 103. Examples of application service 113 include, but are not limited to, Office365® from Microsoft® and Google® Docs, as well as any other suitable application service, combination of services, or variations thereof.

FIG. 9 illustrates computing system 901 that is representative of any system or collection of systems in which the various operational architectures, scenarios, and processes disclosed herein may be implemented. Examples of computing system 901 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at least document process 906, which is representative of document process 200 and document process 300 discussed with respect to the foregoing implementations. When executed by processing system 902 to enhance document productivity, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing document process, user interface, and their respective functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include document process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced document productivity. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 as an example, through the operation of a computing system or systems of which computing system 901 is representative, transformations may be performed with respect to service architecture 100, and user interface 105 and document 107 in particular. As an example, user interface 105 in a first state includes a presentation of document 107. Upon an entry being recognized as an entity, an indication of the recognition is surfaced, thereby changing its state. A further transformation occurs when view 109 is surfaced in response to a user electing to explore an entity in more depth. Finally, document 107 is changed when an entity is selected from view 109 for inclusion in (writing to) document 107.

It may be understood that computing system 901 is generally intended to represent a computing system or systems on which software 905 may be deployed and executed in order to implement enhanced document productivity. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface. For example, user interface 105 may be presented through user interface system 909. Likewise, the various stages 400, 501, 502, 503, 600, and 700 discussed with respect to workbook 401 may be presented through user interface system 909. In addition, user input made with respect to user interface 105 or discussed with respect to the user experience may be input via user interface system 909.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-9 generally depict relatively few operational scenarios and sequences, it may be appreciated that the concepts disclosed herein may be applied at scale and routinely. For example, the application service disclosed herein could be deployed in support of any number of local applications and any number of documents.

It may be appreciated from the foregoing that a method of operating an application service to enhance document productivity includes examining a plurality of entries in a document hosted by the application service to identify at least an entry recognizable as an entity that is potentially related to at least one of a plurality of additional entities external to the document. The method also includes identifying at least a subset of the plurality of additional entities to surface in a user interface to the application service for potential inclusion in the document and, in response to a selection of at least one of the subset of the plurality of additional entities received via the user interface, including at least the one of the subset of the additional entities in the document in association with the entry.

The method may further include, in response to identifying a subsequent entry recognizable as a subsequent entity that is potentially related to at least a subsequent one of the plurality of additional entities external to the document, identifying the subsequent one of the plurality of additional entities based at least in part on a pattern of association established with respect to the entity and the at least one of the subset of the plurality of additional entities, and including at least the subsequent one of the subset of the additional entities in the document in association with the subsequent entry.

It may also be appreciated from the foregoing that an apparatus may include one or more computer readable storage media and program instructions stored on the one or more computer readable storage media for enhancing document productivity. The program instructions, when executed by a processing system, may direct the processing system to at least, in a user interface to an application service that hosts a document comprising a plurality of entries, surface an option to explore at least an entry of the plurality of entries that has been recognized as an entity that is potentially related to at least one of a plurality of additional entities external to the document. The program instructions may further direct the processing system to, in response to a selection of the option, surface at least a subset of the plurality of additional entities identified for potential inclusion in the document and, in response to a selection of at least one of the subset of the plurality of additional entities received via the user interface, communicate a request for the application service to include at least the one of the subset of the additional entities in the document. In some implementations, the apparatus may include the processing system configured to execute the program instructions.

In certain implementations, one or more computer readable storage media may have program instructions stored there on for enhancing document productivity that, when executed by a processing system, direct the processing system to at least examine a plurality of entries in a document to identify at least an entry recognizable as an entity that is potentially related to at least one of a plurality of additional entities external to the document. The program instructions may further direct the processing system to surface an indication in a user interface that the entry has been recognized. In response to an interaction with the user interface made with respect to the indication, the processing system under the direction of the program instructions may identify and surface at least a subset of the plurality of additional entities in the user interface for potential inclusion in the document. The processing system may also, under the direction of the program instructions and in response to a selection of at least one of the subset of the plurality of additional entities received via the user interface, include at least the one of the subset of the additional entities in the document in association with the entry.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A device implemented method of operating an application service to enhance productivity of filling a document hosted by the application service, the method comprising:
   based at least on a query to a data source external to the document, identifying an entry in a first cell of the document as an entity;
   surface, in a user interface to the application service, an information item of the entity;
   in response to receiving a selection of the information item, incorporating at least the information item into a second cell of the document that is distinct from the first cell;
   determining a pattern of association between the entry and the information item;
   based at least on another query to the data source external to the document and in response to receiving input of a subsequent entry, identifying the subsequent entry as a subsequent entity; and
   based at least on the pattern of association, auto-filling at least a subsequent information item of the subsequent entity into a subsequent cell of the document.

2. The method of claim 1 wherein incorporating at least the information item into a second cell of the document that is distinct from the first cell comprises inserting a column into the document and populating at least a cell of the column with at least the information item.

3. The method of claim 2 wherein the document comprises a spreadsheet, wherein the entry comprises text entered in the first cell in the spreadsheet, and wherein the subsequent entry comprises subsequent text entered in a subsequent cell in the spreadsheet.

4. The method of claim 1 further comprising surfacing the information item of the entity within a card in the user interface that is rendered above the document, and receiving the selection of the information item via the card.

5. The method of claim 4 wherein the selection of the information item comprises a drag operation that drags at least an indication of the information item from the card to the document.

6. The method of claim 1 further comprising surfacing an indication in the user interface that the entry had been recognized as the entity.

7. The method of claim 6 wherein the indication includes a confidence indicator that represents a level of confidence associated with identifying the entry as the entity.

8. The method of claim 1 wherein the data source external to the document comprises at least one of a contacts database and a web site.

9. An apparatus comprising:
   one or more computer readable storage media; and
   program instructions stored on the one or more computer readable storage media for enhancing productivity of filling a document hosted by an application service that, when executed by a processing system, direct the processing system to at least:
   based at least on a query to a data source external to the document, identify an entry in a first cell of the document as an entity and surface an option selectable to surface an information item of the entity;
   in response to receiving a selection of the information item, communicate a request for the application service to incorporate at least the information item into a second cell of the document that is distinct from the first cell and determine a pattern of association between the entry and the information item; and
   based at least on another query to the data source external to the document and in response to receiving input of a subsequent entry, communicate a subsequent request for the application service to identify the subsequent entry as a subsequent entity and, based at least on the pattern of association, auto-fill at least a subsequent information item into a subsequent cell of the document.

10. The apparatus of claim 9 wherein the document comprises a spreadsheet, wherein the entry comprises text entered in the first cell in the spreadsheet, and wherein the subsequent entry comprises subsequent text entered in a subsequent cell in the spreadsheet.

11. The apparatus of claim 9 wherein the program instructions further direct the processing system to surface the information item of the entity on a card rendered above the document.

12. The apparatus of claim 11 wherein the selection of the information item comprises a drag operation that drags at least an indication of the information item from the card to the document.

13. The apparatus of claim 9 further comprising the processing system configured to execute the program instructions and a user interface system for rendering the user interface, wherein the program instructions further direct the processing system to surface an indication in the user interface that the entry had been recognized as the entity.

14. The apparatus of claim 13 wherein the indication includes a confidence indicator that represents a level of confidence associated with identifying the entry as the entity.

15. One or more computer readable storage media having program instructions stored there on for enhancing productivity of filling a document hosted by an application service that, when executed by a processing system, direct the processing system to at least:
   based at least on a query to a data source external to the document, identify an entry in a first cell of the document and as an entity;
   surface an indication in a user interface that the entity has been identified;
   in response to receiving an interaction via the user interface made with respect to the indication, identify and surface in the user interface an information item of the entity; and
   in response to receiving a selection via the user interface of the information item, incorporate at least the information item into a second cell of the document that is distinct from the first cell;
   determine a pattern of association between the entry and the information item;
   based at least on another query to the data source external to the document and in response to receiving input of a subsequent entry, identify the subsequent entry as a subsequent entity; and
   based at least on the pattern of association, auto-fill at least a subsequent information item into a subsequent cell of the document.

16. The computer readable storage media of claim 15 wherein to incorporate at least the information item into a second cell of the document that is distinct from the first cell, the program instructions further direct the processing system to insert a column into the document and populating at least a cell of the column with at least the information item.

17. The computer readable storage media of claim 16 wherein the document comprises a spreadsheet, wherein the entry comprises text entered in the first cell in the spreadsheet, and wherein the subsequent entry comprises subsequent text entered in a subsequent cell in the spreadsheet.

18. The computer readable storage media of claim 17 wherein the program instructions direct the processing system to surface the information item within a card in the user interface in a manner such that that the card is rendered visually above the document and receiving the selection of the information item via the card.

19. The computer readable storage media of claim 18 wherein the selection of the information item comprises a drag operation that drags at least an indication of the information item from the card to the document.

20. The computer readable storage media of claim 15 wherein the indication includes a confidence indicator that represents a level of confidence associated with identifying the entry as the entity and wherein the data source external to the document comprises at least one of a contacts database and a web site.

* * * * *